(12) United States Patent
Reinhart (10) Patent No.: US 9,717,330 B2
(45) Date of Patent: Aug. 1, 2017

(54) SHELVING WITH MOLDED END CAPS

(71) Applicant: Creative Plastic Concepts, LLC, Sycamore, OH (US)

(72) Inventor: Nickolas Reinhart, Findlay, OH (US)

(73) Assignee: Creative Plastic Concepts, LLC, Sycamore, OH (US)

( * ) Notice: Subject to any disclaimer, the term of this patent is extended or adjusted under 35 U.S.C. 154(b) by 0 days.

(21) Appl. No.: 14/730,566

(22) Filed: Jun. 4, 2015

(65) Prior Publication Data

US 2015/0351533 A1 Dec. 10, 2015

Related U.S. Application Data (60) Provisional application No. 62/008,200, filed on Jun. 5, 2014.

(51) Int. Cl.
| | |
|---|---|
| *A47B 47/00* | (2006.01) |
| *A47B 96/02* | (2006.01) |
| *A47B 96/06* | (2006.01) |
| *A47B 47/04* | (2006.01) |
| *A47B 87/02* | (2006.01) |
| *F16B 12/42* | (2006.01) |

(52) U.S. Cl.
CPC ........ *A47B 47/0091* (2013.01); *A47B 47/047* (2013.01); *A47B 87/0223* (2013.01); *A47B 96/02* (2013.01); *A47B 96/06* (2013.01); *F16B 12/42* (2013.01)

(58) Field of Classification Search
CPC ............ A47B 87/0207; A47B 87/0223; A47B 87/0246; A47B 87/0253; A47B 96/02; A47B 96/06; A47B 96/021; A47B 47/00; A47B 47/0091; A47B 47/024; A47B 2087/023; A47B 47/047; F16B 12/42
USPC .......................................................... 211/188
See application file for complete search history.

(56) References Cited

U.S. PATENT DOCUMENTS

| | | | | | |
|---|---|---|---|---|---|
| 2,529,649 | A | * | 11/1950 | Coplen | A47B 47/021 |
| | | | | | 108/190 |
| 4,467,927 | A | * | 8/1984 | Nathan | A47B 87/0223 |
| | | | | | 108/192 |
| 4,621,740 | A | * | 11/1986 | Lang | A47B 87/0223 |
| | | | | | 211/126.12 |
| 4,696,406 | A | * | 9/1987 | Karashima | A47B 96/021 |
| | | | | | 108/110 |
| 4,706,824 | A | * | 11/1987 | Mercer | A47F 5/118 |
| | | | | | 108/186 |
| 4,930,643 | A | * | 6/1990 | Flum | F16B 12/42 |
| | | | | | 211/188 |
| 5,218,914 | A | * | 6/1993 | Dickinson | A47B 87/0223 |
| | | | | | 108/186 |
| D383,014 | S | * | 9/1997 | Sagol | D6/675.1 |
| 5,695,081 | A | * | 12/1997 | Alkalay | A47B 47/04 |
| | | | | | 108/147.12 |

(Continued)

*Primary Examiner* — Patrick Hawn
(74) *Attorney, Agent, or Firm* — Ward Law Office LLC; Jacob M. Ward (57) ABSTRACT

A shelving system includes a plurality of shelf members and a plurality of supports configured to support the shelf members. The shelving system further includes a plurality of end caps. Each of the end caps has at least one sleeve with a slot formed therein for receiving an end of one of the shelf members and a plurality of retaining features. Each retaining feature has an inner surface defining a cavity for receiving an end of one of the supports.

18 Claims, 10 Drawing Sheets

(56) References Cited

U.S. PATENT DOCUMENTS

| | | | | |
|---|---|---|---|---|
| 5,709,158 A * | 1/1998 | Wareheim | A47B 96/021 | 108/180 |
| 5,964,163 A * | 10/1999 | Cohen | A47B 49/004 | 108/186 |
| 6,079,339 A * | 6/2000 | Houk, Jr. | A47B 87/0223 | 108/157.13 |
| 6,202,867 B1 * | 3/2001 | Di Blasi | A47B 47/0075 | 108/138 |
| 6,520,356 B2 * | 2/2003 | Miller, Jr. | A47F 5/10 | 108/106 |
| 6,601,715 B2 * | 8/2003 | Hardy | A47B 96/024 | 211/188 |
| 6,820,757 B2 * | 11/2004 | Craft | A47B 96/021 | 211/133.1 |
| 9,468,292 B2 * | 10/2016 | Kuehn | A47B 57/34 | |
| 2002/0000418 A1 * | 1/2002 | Miller, Jr. | A47F 5/0018 | 211/188 |
| 2002/0074304 A1 * | 6/2002 | Hardy | A47B 87/0207 | 211/188 |
| 2003/0146180 A1 * | 8/2003 | Craft | A47B 87/0223 | 211/188 |
| 2004/0159622 A1 * | 8/2004 | Craft | A47B 87/0246 | 211/153 |

* cited by examiner

| ITEM NO. | PART NUMBER | DESCRIPTION | WEIGHT | QTY. |
|---|---|---|---|---|
| 1 | SHELF ENDCAP | SHELF END CAP | 0.4 | 8 |
| 2 | PLYWOOD SHELF | 3/4 THICK X 18 INCH X 36 INCH | 6.0 | 8 |
| 3 | SUPPORT TUBE | 1.5 X 1.5 X 24 INCH TUBE 0.08 WALL | 0.4 | 18 |
| 4 | SHELF T ENDCAP | SHELF END CAP | 0.6 | 4 |
| 5 | NO. 8 SCREW | NO. 8 X 3/4 LG. WOOD SCREW | 0.0 | 16 |

FIG 3

| ITEM NO. | PART NUMBER | DESCRIPTION | WEIGHT | QTY. |
|---|---|---|---|---|
| 1 | SHELF ENDCAP | SHELF END CAP | 0.4 | 8 |
| 2 | PLYWOOD SHELF | 3/4 THICK X 18 INCH X 36 INCH | 6.0 | 4 |
| 3 | SUPPORT TUBE | 1.5 X 1.5 X 24 INCH TUBE 0.08 WALL | 0.4 | 12 |
| 4 | NO. 8 SCREW | NO. 8 X 3/4 LG. WOOD SCREW | 0.0 | 8 |

SHELVING WITH MOLDED END CAPS

CROSS REFERENCE TO RELATED APPLICATIONS

This application claims the benefit of U.S. Provisional Application Ser. No. 62/008,200, filed on Jun. 5, 2014. The above application is hereby incorporated herein by reference.

FIELD

The disclosure generally relates to modular shelving systems and, in particular, a modular shelving system having molded end caps.

BACKGROUND

Modular shelving systems are known in the art for storing and supporting items and products of all types. Modular shelving provides a customer with the flexibility to assemble or build shelving unit configurations according to the customer's desires and needs.

Known modular shelving assemblies have certain disadvantages, including complex and time-consuming assembly. An assortment of components may also be required, which may be heavy or unwieldy. Additionally, once assembled, such shelving systems are difficult and time consuming to disassemble and modify, which may be required as the needs of the customer change. Furthermore, the known modular shelving systems may also lack the durability and rigidness of preassembled shelving systems.

There is a continuing need for a modular shelving system that is durable and rigid, yet is easy to assemble with a minimal amount of components.

SUMMARY

In concordance with the instant disclosure, a modular shelving system that is durable and rigid, yet is easy to assemble with a minimal amount of components, has surprisingly been discovered.

In an illustrative embodiment, an end cap for use in assembling a shelving system is disclosed. The end cap includes at least one sleeve having a slot formed therein configured for receiving an end of a shelf member. A plurality of retaining features are integrally formed with and extend outwardly from an outer surface of the sleeve. Each of the retaining features having an inner surface defining a cavity configured for receiving an end of a support.

In another embodiment, the disclosure includes a shelving system. The shelving system includes a plurality of shelf members and a plurality of supports configured to support the shelf members. The shelving system further includes a plurality of end cap. Each of the end caps have at least one sleeve having a slot formed therein for receiving an end of one of the shelf members and a plurality of retaining features. Each retaining feature has an inner surface defining a cavity for press-fittingly receiving an end of one of the supports.

In a further embodiment, the disclosure includes a kit. The kit includes a plurality of shelf members, a plurality of supports, and a plurality of end caps.

DRAWINGS

The above, as well as other advantages of the present disclosure, will become readily apparent to those skilled in the art from the following detailed description, particularly when considered in the light of the drawings described hereafter.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

The terms "upper" and "lower" are used herein for convenience in reference to the configuration of a shelving system with respect to gravity.

Figure 1:
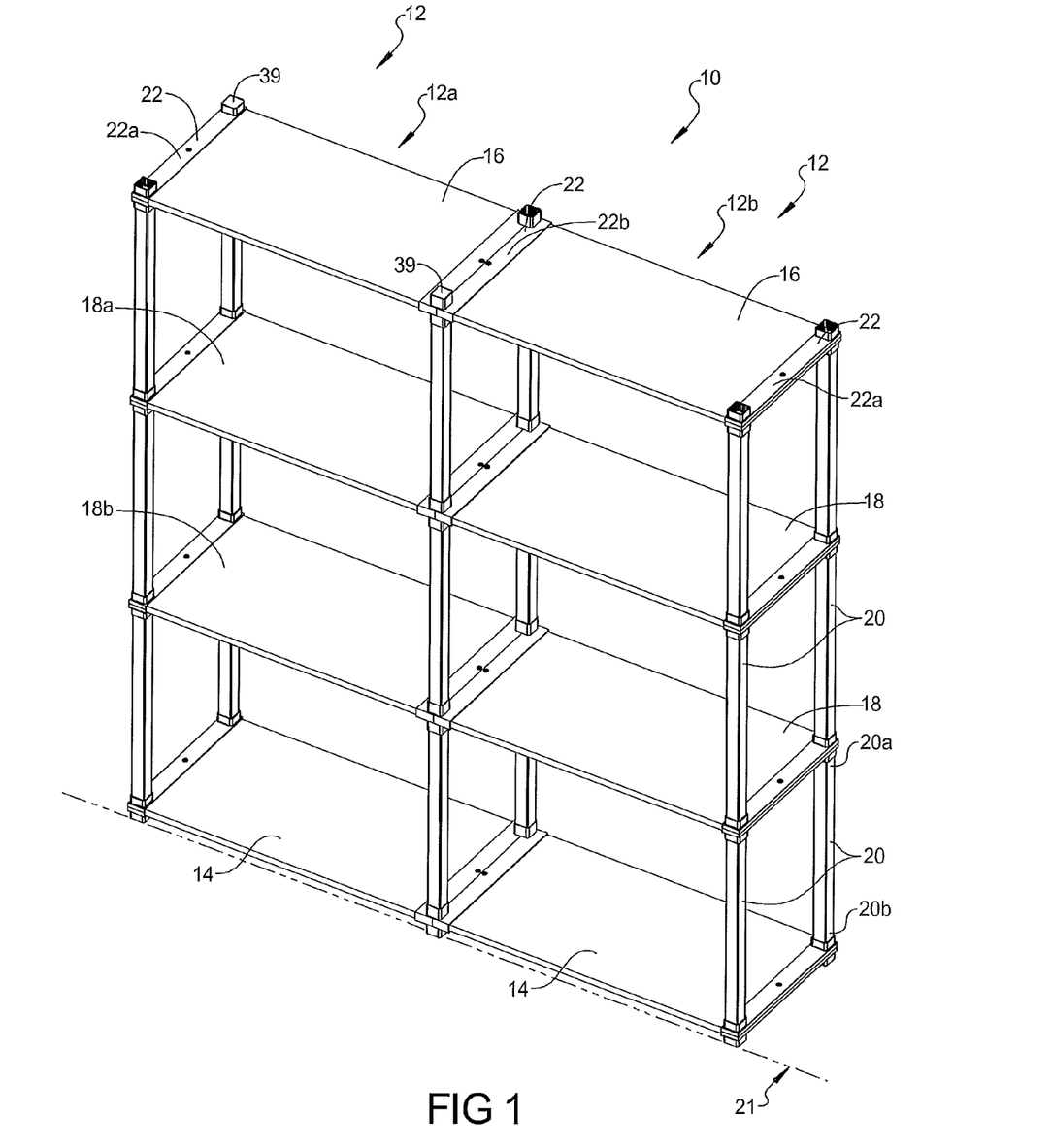
FIG. 1 shows a shelving system according to one aspect of the present disclosure, wherein the shelving system is a double shelf system.
Figure 2:
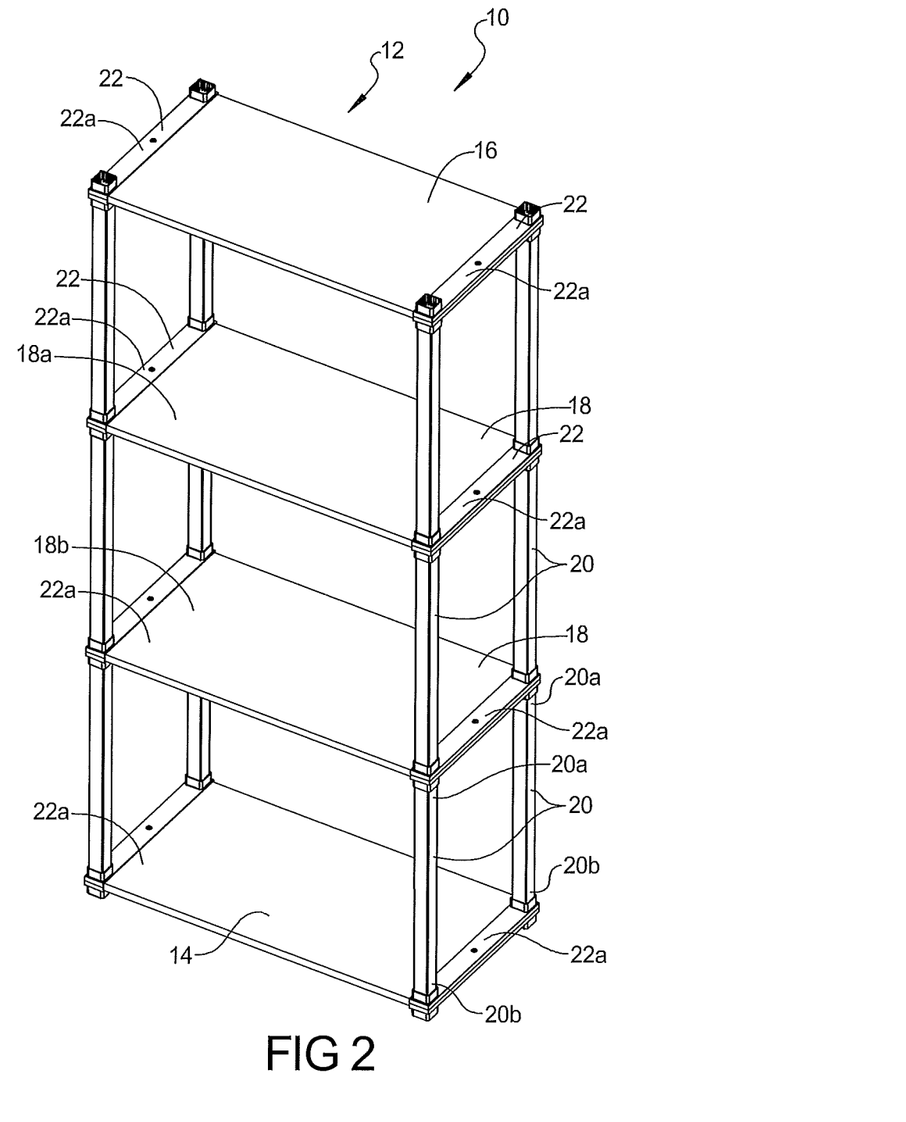
FIG. 2 shows a shelving system according to an aspect of the present disclosure, wherein the shelving system is a single shelf system.
Figure 3:
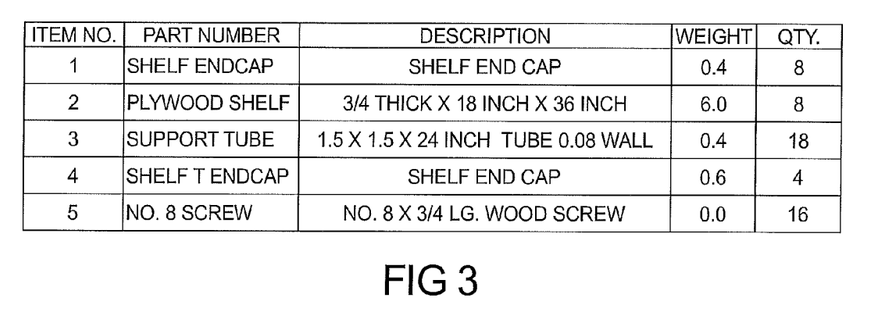
FIG. 3 is a chart illustrating an exemplary bill of materials for the shelving system of FIG. 1.
Figure 4:
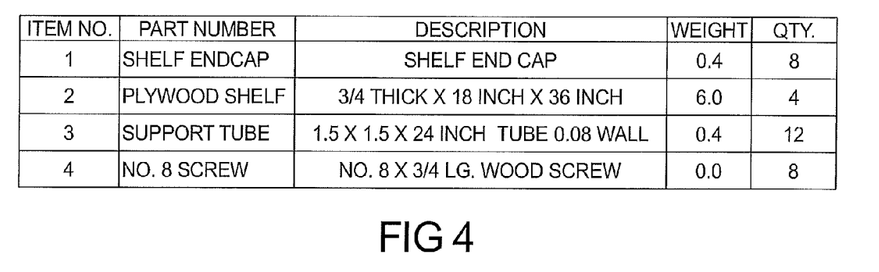
FIG. 4 is a chart illustrating an exemplary bill of materials for the shelving system of FIG. 2.
Figure 5A:
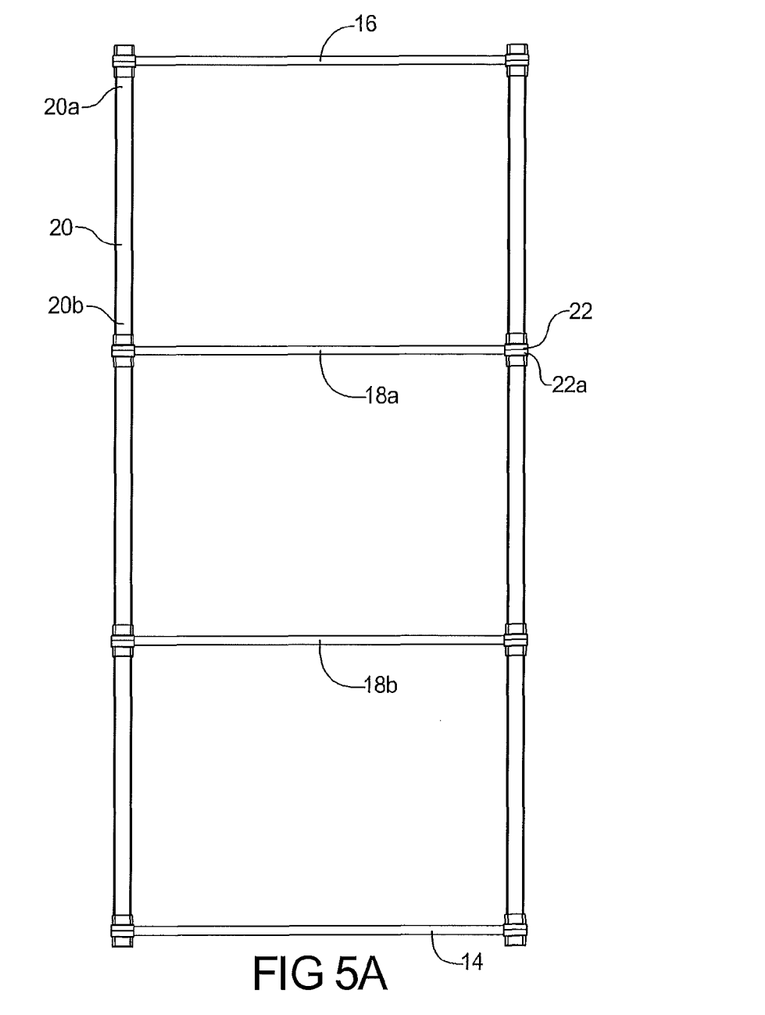
FIG. 5A shows a front elevational view of the shelving system of FIG. 2.
Figure 5B:
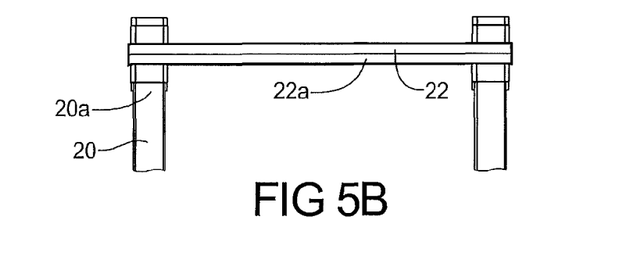
FIG. 5B shows a fragmentary end elevational view of the shelving system of FIG. 2.

FIGS. 1-2 illustrate an assembled shelving system 10 according to one embodiment of the disclosure. In the aspect illustrated in FIG. 1, the shelving system 10 is a double shelf system having two vertical columns of shelves 12, defining a first vertical column 12a and a second vertical column 12b. In the aspect illustrated in FIG. 2, the shelving system 10 is a simple or single shelf system having a single vertical column of shelves 12. It should be understood that the shelving system 10 can include any number of columns or other configurations of shelves 12, as desired. All dimensions and materials identified are merely illustrative in nature, and should not be considered limiting unless otherwise disclosed.

Each vertical column of the shelves 12 of the shelving system 10 includes a lower shelf member 14, an upper shelf member 16, and one or more intermediate shelf members 18 such as intermediate shelf members 18a, 18b. The intermediate shelf members 18 are disposed between the lower shelf member and 14 the upper shelf member 16. Each of the shelf members, 14, 16, 18 is planar, substantially rectangular, and formed from laminated wood, or natural wood, as non-limiting examples. However, the shelf members 14, 16, 18 can be formed from any material as desired, such as plastic or metal, for example.

While the non-limiting example in FIG. 1 illustrates four shelf members (14, 16, 18*a*, 18*b*) in each of the first and the second vertical columns of shelves 12*a*, 12*b*, it is understood that each column of shelves 12*a*, 12*b* can have any number of shelf members, as desired. For example, each column of shelves 12 can have two, three, or five shelf members, for example. Different columns of shelves 12 can also have a same number or a varying number of shelf members 14, 16, 18, within the scope of the present disclosure.

The shelving system 10 further includes elongate supports 20 such as tubes, and end caps 22. The end caps 22 can be single end caps 22*a* or T-shaped end caps 22*b*, each of which is further described hereinbelow. The tubes 20 when oriented vertically upright with respect to a floor 21 or planar support surface are configured to support the shelf members 14, 16, 18 which are oriented substantially parallel to the floor 21. For example, each of the tubes 20 may have a substantially square cross-section shape. However, in other aspects, the tubes 20 can have a different cross-sectional shape such as substantially rectangular or circular, as non-limiting examples.

Although the supports 20 are described primarily herein with respect to tubes 20, in certain embodiments, the tubes 20 can alternatively be solid or substantially solid and elongate supports 20, as desired.

Each of the tubes 20 extends between adjacent shelf members 14, 16, 18 in the vertical columns of shelves 12. The tubes 20 can have any dimensions, as desired. For example, the tubes 20 can have a width equal to 3.8 cm (1.5 in), a thickness equal to 3.8 cm (1.5 in), a length equal to 61 cm (24 in), and a wall thickness of 0.20 cm (0.08 in). The tubes 20 can be formed from any rigid material such as lightweight metal or plastic, for example. Each of the tubes 20 has an upper end 20*a* and a lower end 20*b* which is coupled to one of the end caps 22*a*, 22*b*.

FIGS. 6-9 illustrate the single end caps 22*a* according to one aspect of the disclosure. The single end cap 22*a* includes a sleeve 24 having an outer surface 26, an inner surface 28, an open end 27, and a closed end 29. The inner surface 28 of the sleeve 24 defines a slot 30 for receiving an end 31 of one of the shelf members 14, 16, 18 via the open end 27. The slot 30 has a shape substantially corresponding to a shape of the end 31 of the shelf members 14, 16, 18. In particular aspects, the slot 30 is configured to provide a friction fit with the end 31 of the shelf members 14, 16, 18. In certain aspects, the sleeve 24 is formed by a first wall 24*a*, a second wall 24*b*, and a third wall 24*c*. The walls 24*a*, 24*b*, 24*c* may form a substantially U-shaped sleeve, for example.

Figure 6:
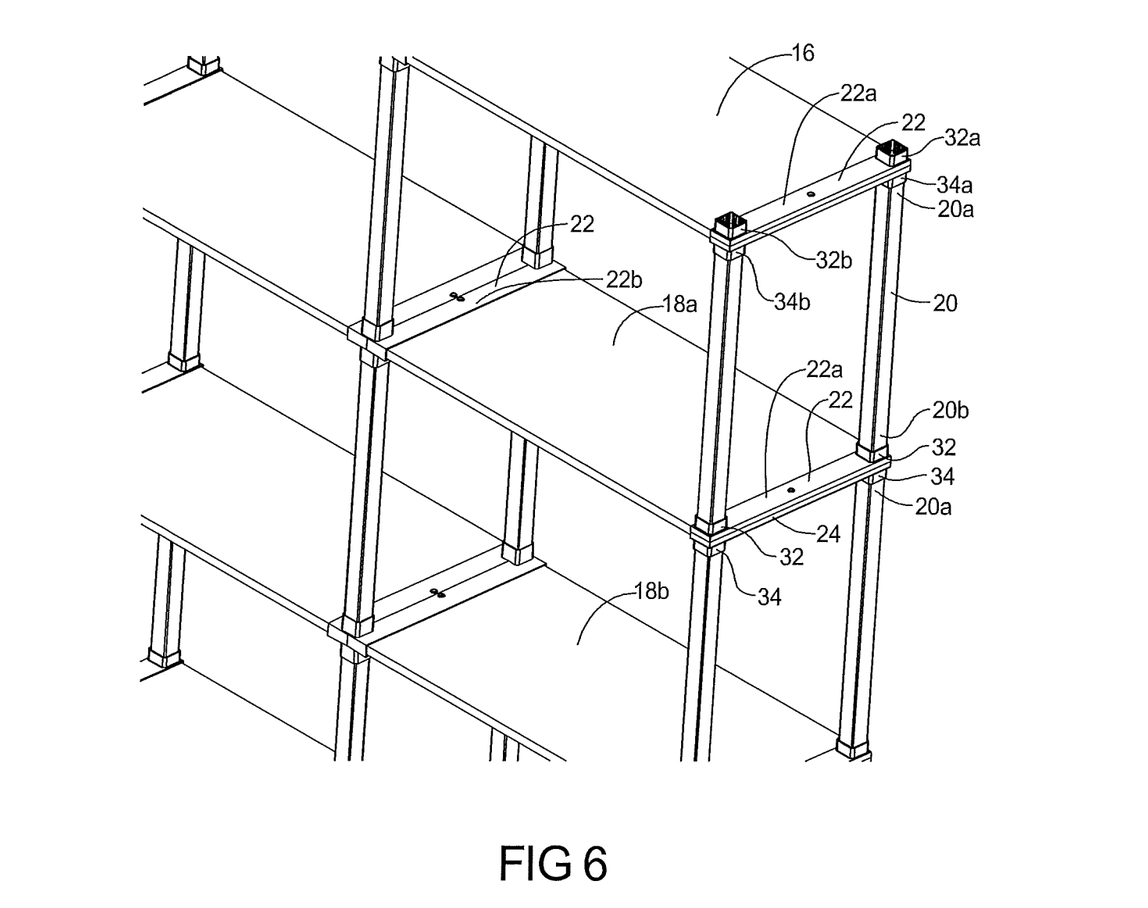
FIG. 6 illustrates end caps employed with the shelving systems of FIGS. 1 and 2, including single end caps and T-shaped end caps.
Figure 8:
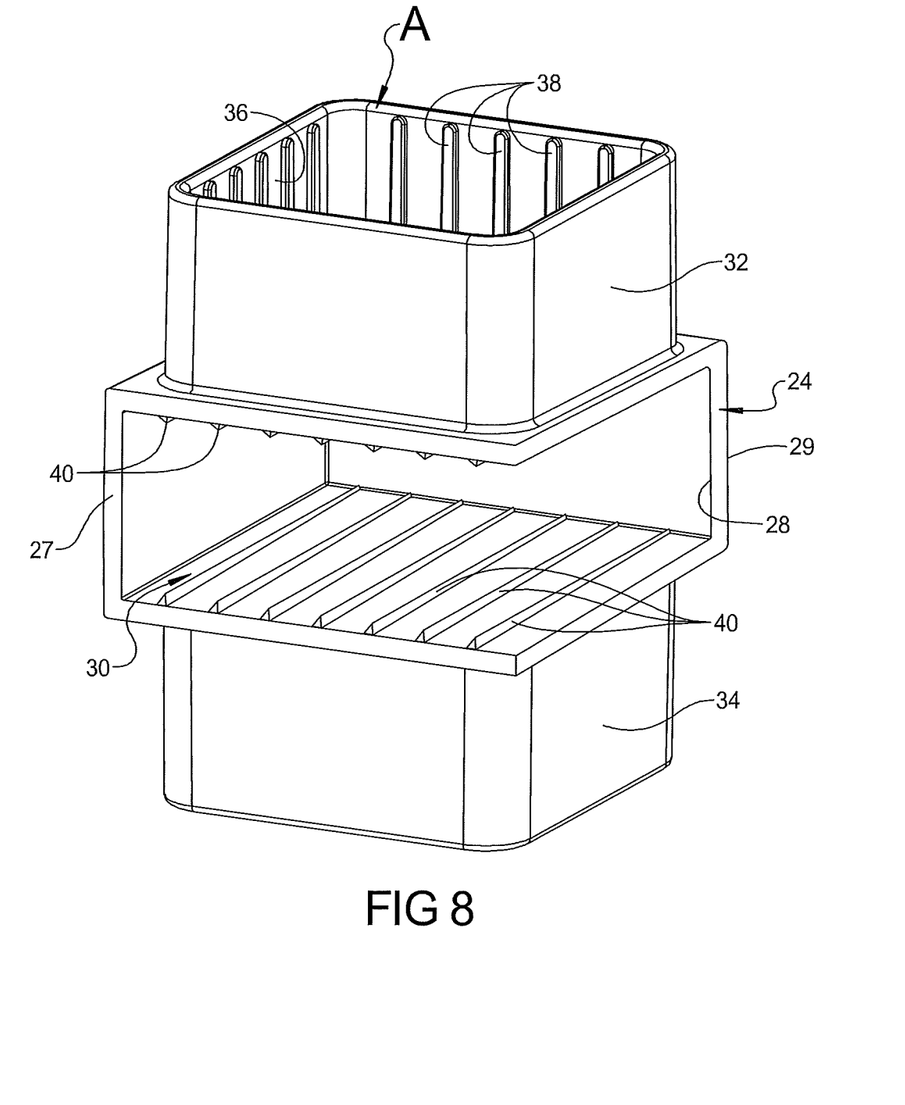
FIG. 8 is a partial cross-sectional view of a single end cap depicted in FIG. 6.

As also shown in FIGS. 6 and 8, the end cap 22*a* further includes a pair of first retaining features 32 for receiving the lower end 20*b* of two of the tubes 20 and a pair of second retaining features 34 for receiving the upper end 20*a* of two other ones of the tubes 20. The first retaining features 32, shown for example in FIG. 6 as first retaining features 32*a*, 32*b* are individually positioned at opposite ends of the sleeve 24 and extend outwardly from the outer first wall 24*a* of the outer surface 26 of the sleeve 24 in a direction substantially perpendicular to the sleeve first wall 24*a* of the sleeve 24. The second retaining features 34, shown for example in FIG. 6 as second retaining features 34*a*, 34*b* are also individually positioned at opposite ends of the sleeve 24 and extend outwardly from the sleeve third wall 24*c* of the outer surface 26 of the sleeve 24 in an opposite direction from the first retaining features 32, and substantially perpendicular to the outer surface 26 of the sleeve 24. Each of the retaining features 32, 34 are integrally formed with the outer surface 26 of the sleeve 24. In the aspect shown, the first retaining features 32*a*, 32*b* are oriented parallel to each other and extend from the first wall 24*a*, and the second retaining features 34*a*, 34*b* are oriented parallel to each other. According to several aspects, the first retaining feature 32*a* is individually coaxially aligned with an individual one, 34*a* of the second retaining features 34, and the first retaining feature 32*b* is individually coaxially aligned with an individual one, 34*b* of the second retaining features 34. Each of the second retaining features 34 are integrally formed with and extend from the third wall 24*c*.

Each of the first and the second retaining features 32, 34 has a shape corresponding to a shape of the ends 20*a*, 20*b* of the tubes 20 such that the ends 20*a*, 20*b* of the tubes 20 fit within and are surrounded by walls of the retaining features 32, 34. According to an exemplary aspect shown, the walls defined by the retaining features 32, 34 can have a substantially rectangular shape to correspond to a rectangular shape of the tubes 20. However, the wall or walls of the retaining features 32, 34 can have any shape such as circular or triangular, to correspond to tubes 20 having circular or triangular shapes. In particular aspects, the retaining features 32, 34 are configured to receive and provide a friction fit with the ends of the tubes 20.

Figure 7:
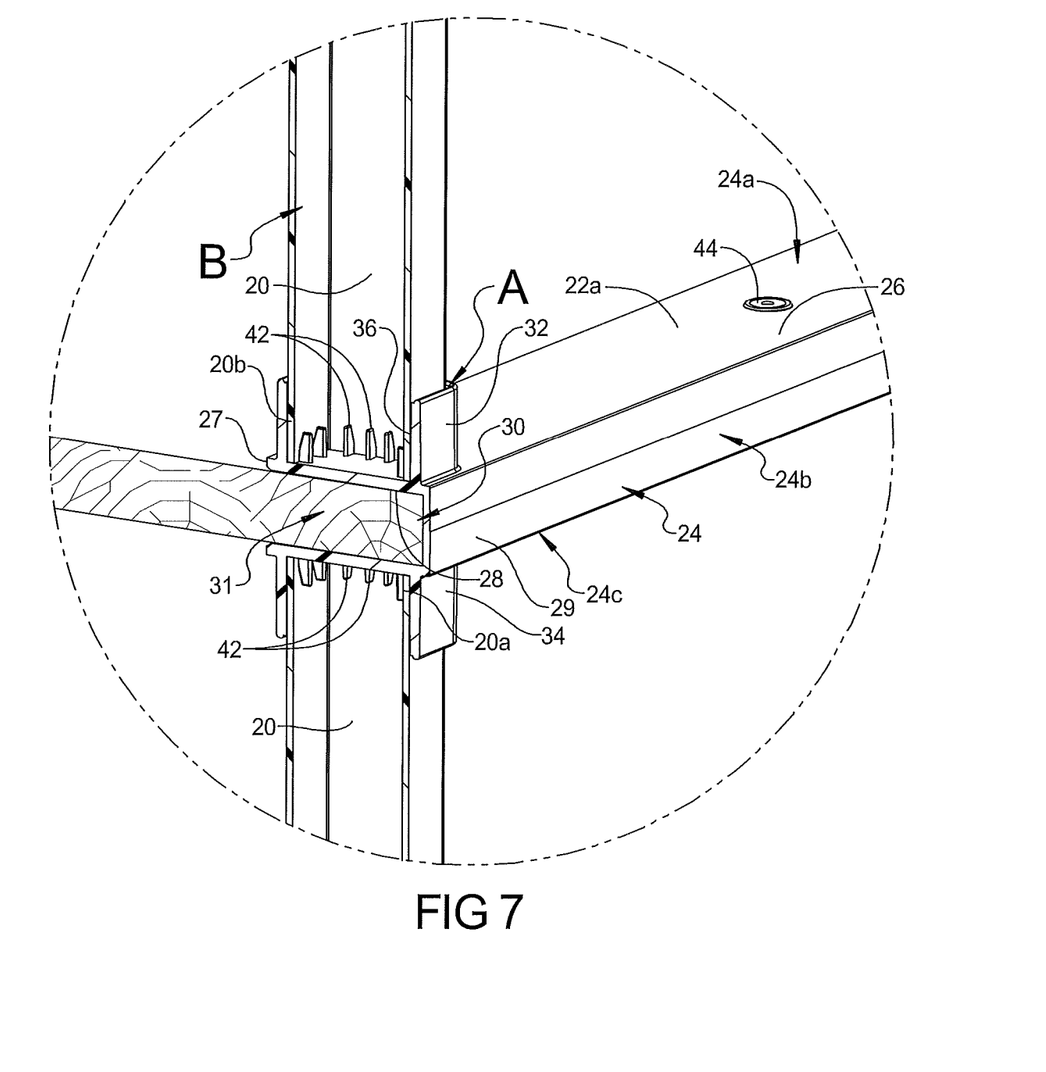
FIG. 7 is an enlarged cross-sectional view showing retaining features of a single end cap depicted in FIG. 6.
Figure 9:
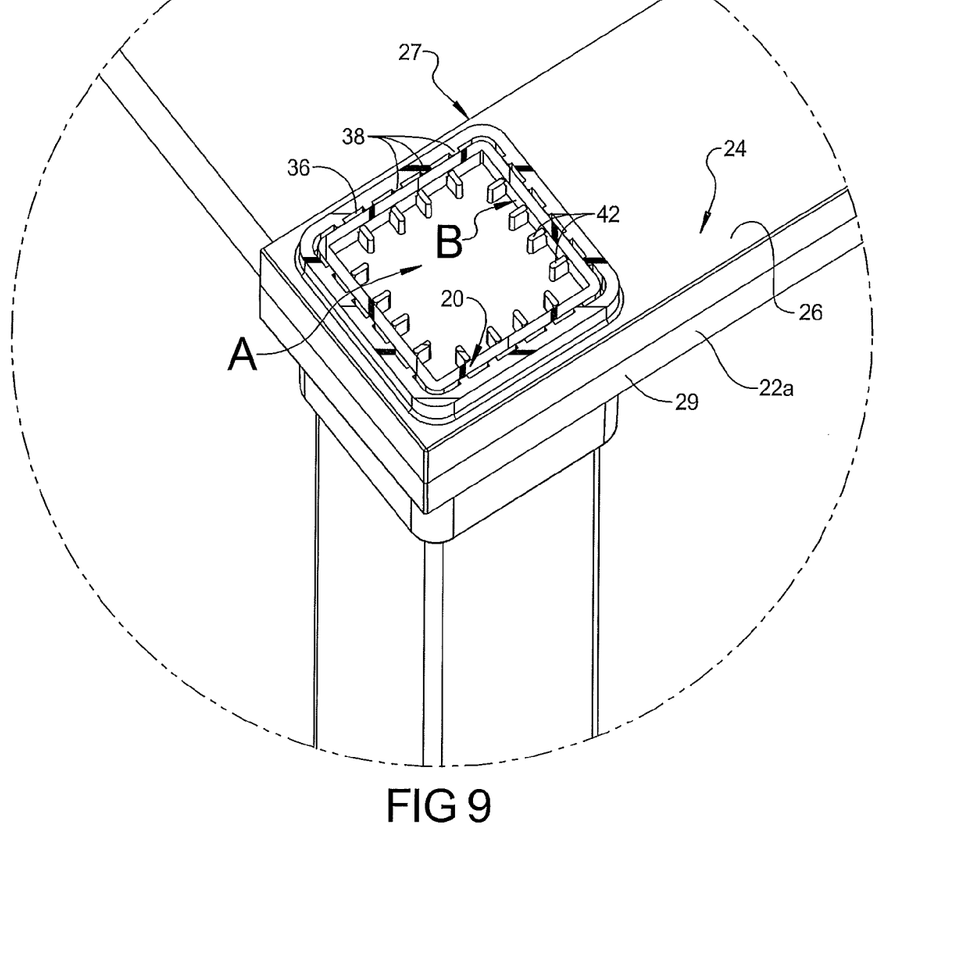
FIG. 9 is an enlarged cross-sectional view of retaining features of the single end cap of FIG. 6, wherein the retaining features are receiving an end of a tube.

As illustrated in FIGS. 7-9, the wall or walls of each of the retaining features 32, 34 have an inner surface 36 defining a cavity "A". A plurality of ribs 38 are disposed on the inner surface 36 of the retaining features 32, 34. The ribs 38 are integrally formed with the inner surface 36 and are configured to facilitate a press fit between the retaining features 32, 34 and the ends 20*a*, 20*b* of the tubes 20. The ribs 38 can taper in thickness from an open end of the retaining features 32, 34 toward the outer surface 26 of the sleeve 24, for example, to thereby facilitate the press fit.

Referring more specifically to FIG. 8, the inner surface 28 of the sleeve 24 can include elongate protrusions 40 integrally formed thereon and extending into the slot 30 to facilitate a press fit between the sleeve 24 and the shelf members 14, 16, 18. The protrusions 40 can be located on the sleeve inner surfaces oppositely located with respect to each of the retaining features 32, 34. In certain aspects, successive ones of the protrusions 40 are arranged parallel to each other and can taper in thickness inwardly from the open end 27 of the sleeve 24 to the closed end 29 of the sleeve 24. The tapering militates against the shelf members 14, 16, 18 sliding outwardly from the slot 30 of the sleeve 24 after being received by the sleeve 24.

As illustrated in FIGS. 7 and 9, a plurality of wedges 42 may be disposed in the cavity "A" of each of the retaining features 32, 34. Each of the wedges 42 are integrally formed with the outer surface 26 of the sleeve 24 and extend outwardly therefrom in a substantially perpendicular direction. The wedges 42 contact an interior facing surface "B" defining an interior facing wall of individual ones of the tubes 20 and cooperate with the retaining features 32, 34 to form a channel for guiding and receiving the tubes 20. Each of the wedges 42 can have any shape as desired. For example, each of the wedges 42 can have a three dimensional polygonal shape such as trapezoidal, cuboidal, pyramidal, or any other shape as desired. In another example (not shown), in place of the multiple wedges 42 one continuous wedge or protuberance 42 can be used, which cooperates with the inner surface 36 of the retaining features 32, 34 to form a channel for receiving the tubes 20.

Figure 11:
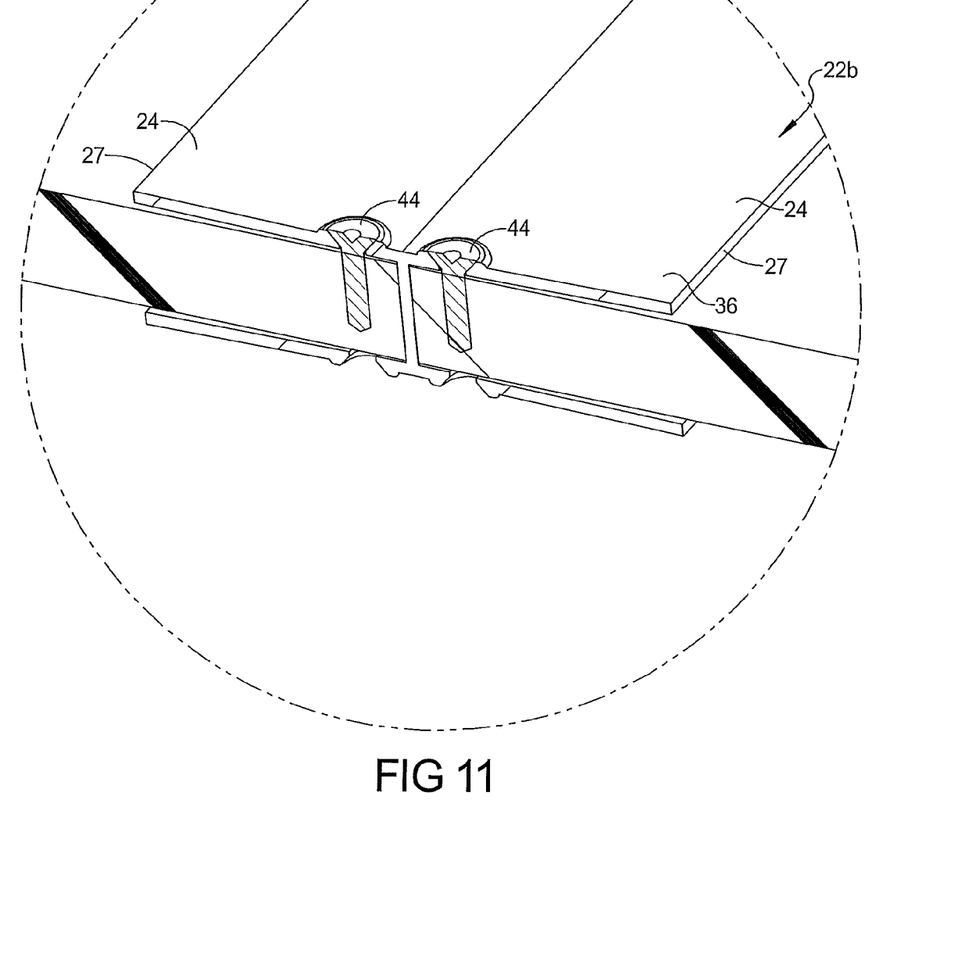
FIG. 11 is a cross-sectional view of a T-shaped end cap depicted in FIG. 10, further shown coupled to shelving members.

Referring to FIGS. 7 and 11, each of the end caps 22*a* can further include a fastener 44 for securing the end caps 22*a* to the shelf members 14, 16, 18. In a non-limiting example, as illustrated in FIG. 7, the fastener 44 can be a wood screw. In other examples, the fastener 44 can be a pin, a bolt, a clamp, or any other connector or coupling means, as desired.

Figure 10:
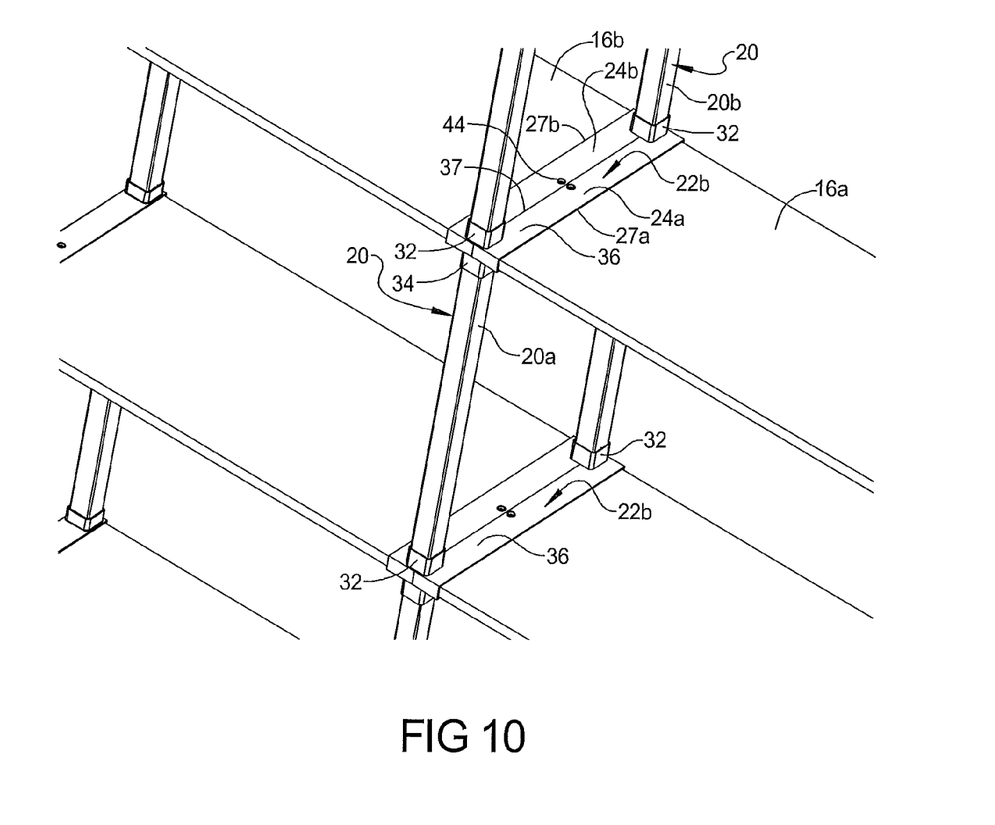
FIG. 10 illustrates the T-shaped end caps depicted in FIG. 6.

With reference to FIGS. 10-11, the T-shaped end caps 22*b* for use with the shelving system 10 are illustrated in a double shelf system with multiple vertical columns of shelves 12. Each T-shaped end cap 22*b* is similar to the single end cap 22*a* described hereinabove, except each T-shaped end cap 22*b* includes two sleeves 24*a*, 24*b* coupled to each other. The open end 27*a*, 27*b* of each of the sleeves 24*a*, 24*b* are positioned distally and oppositely facing with respect to each other. The sleeves 24*a*, 24*b* are integrally formed with each other, or can be separately formed and coupled to each other by coupling means, as desired. The slot 30 of sleeve 24*a* of one of the T-shaped end caps 22*b* is configured to receive an end of one of the shelf members such as shelf member 16*a* from one column of shelves 12. The other slot 30 of the other sleeve 24*b* is configured to receive an end of a corresponding one of the shelf members 14, 16, 18 (such as shelf member 16*b* shown) from another column of shelves 12. The retaining features 32, 34 of the T-shaped end caps 22*b* are centrally aligned with respect to a central joint 37 on the T-shaped end caps 22*b*, such that the retaining features 32, 34 are equally and partially disposed on the outer surface 26 of both of the sleeves 24*a*, 24*b*.

Each of the end caps 22*b* can further include a fastener 44 for individually securing the end caps 22*b* to the shelf members 14, 16, 18. In a non-limiting example, as illustrated in FIG. 11, the fastener 44 can be a wood screw. In other examples, the fastener 44 can be such a pin, a bolt, a clamp, or any other connector or coupling means as desired.

In certain aspects, and with continuing reference to FIG. 1, the shelving system 10 includes top covers 39 disposed on one or more of the first retaining features 32 of the end caps 22*a* or 22*b* receiving the upper shelf members 16 of the shelving system 10. The top covers 39 militate against particles, such as dust and dirt, entering the cavity "A" (shown in FIG. 8) formed by the first retaining features 32 when a tube 20 is not received by the retaining features 32. The top covers 39 may also militate against damage to the retaining features 32 and facilitate a polished appearance.

To assemble a simple shelf shelving system 10 as shown in FIGS. 2, 7, and 8, the sleeves 24 of each of the single end caps 22*a* each receive an end of the shelf members 14, 16, 18 forming a press fit between the shelf members 14, 16, 18 and each of the end caps 22*a*. The protrusions 40 militate against the shelf members 14, 16, 18 sliding outwardly from the slots 30 of the sleeves 24. The fastener 44 further secures the sleeves 24 to each of the shelf members 14, 16, 18. The lower end 20*b* of the tubes 20 are received by the first retaining features 32 of the end caps 22*a* of the lower shelf member 14. The upper end 20*a* of the tubes 20 is received by the second retaining features 34 of the end caps 22*a* of the intermediate shelf member 18 adjacent the lower shelf member 14. This process is repeated for each level in the column of shelves 12 until the upper end 20*a* of the tubes 20 are received by the second retaining features 34 of the end caps 22*a* of the upper shelf member 16. The top covers 39 can be positioned to cover the first retaining features 32 of the end caps 22*a* of the upper shelf member 16.

A method of assembly for the double shelving system 10, shown in FIG. 1, is similar to the method of assembly for the simple shelving system, shown in FIG. 2 and described hereinabove. The T-shaped end caps 22*b* are employed to couple the lower shelf member 14, the upper shelf member 16, and the intermediate shelf members 18 of one of the column of shelves 12 such as vertical column 12*a*, to the corresponding lower shelf member 14, upper shelf member 16, and intermediate shelf members 18 of an adjoining one of the other column of shelves 12 such as vertical column 12*b*.

Additional tubes 20 are also employed to build the double shelving system 10. Lower ends 20*b* of the tubes 20 are received in the first retaining features 32 of the T-shaped end caps 22*b* that connect the lower shelf members 14. Upper ends 20*a* of the tubes 20 are received in the second retaining features 34 of the T-shaped end caps 22*b* that connect the intermediate shelf members 18. The lower shelf members 14 are thereby coupled to the intermediate shelf members 18. This process is repeated for each level in the column of shelves 12, until the upper ends 20*a* of the tubes 20 are received by the second retaining features 34 of the T-shaped end caps 22*b* that connect the upper shelf members 16. As shown in FIG. 1, top covers 39 can also be positioned to cover the first retaining features 32 of the T-shaped end caps 22*b* that connect the upper shelf members 16.

Advantageously, the shelving systems 10 can be readily assembled and disassembled for ease of portability, storage, and modifications. The end caps 22*a*, 22*b* allow the shelving system 10 to be assembled with minimal complexity and minimal components, while also maintaining the integrity of the shelving system 10. All the components of the shelving system 10 (i.e., shelf members 14, 16, 18, tubes 20, and end caps 22) are lightweight to further facilitate ease of assembly and disassembly. Furthermore, the end caps 22 can be formed from thermoplastic material, such as PET or polypropylene, and by an injection molding process, which minimizes cost and complexity of manufacturing. It should also be understood the end caps 22 can be formed from any material, such as metal, and by any process, such as stamping or any molding process, as desired The shelving system 10 can be packaged and sold together as a customizable kit. The shelf members 14, 16, 18, the tubes 20, the end caps 22, the fasteners 44, and the top covers can be sold together to enable a user to assemble the shelving system 10. Further coupling means and connectors can be included with the kit along with other materials or any other shelving accessories, as desired.

While certain representative aspects and details have been shown for purposes of illustrating the invention, it will be apparent to those skilled in the art that various changes may be made without departing from the scope of the disclosure, which is further described in the following appended claims.

What is claimed is:

1. An end cap for use in assembling a shelving system, comprising:
   a sleeve having an outer surface and an inner surface, and a slot formed in the end cap defined by the inner surface of the sleeve, the slot configured for receiving an end of a shelf member, the slot positioned between a sleeve first wall, a sleeve second wall, and a sleeve third wall; and
   a plurality of retaining features integrally formed with and extending outwardly from the outer surface of the sleeve, each of the retaining features having an inner surface defining a cavity configured for receiving an end of a support, and
   wherein the inner surface of the slot has a plurality of elongate protrusions integrally formed thereon to facilitate a press fit between the sleeve and the shelf member, and wherein successive ones of the protrusions are arranged parallel to each other and taper in thickness inwardly from an open end of the sleeve to a closed end of the sleeve, and wherein the thickness at the open end is greater than the thickness at the closed end.

2. The end cap for use in assembling a shelving system of claim 1, wherein the plurality of retaining features includes a pair of first retaining features for receiving a lower end of the support for each of two supports.

3. The end cap for use in assembling a shelving system of claim 2, wherein the plurality of retaining features includes a pair of second retaining features for receiving an upper end of two other ones of the supports.

4. The end cap for use in assembling a shelving system of claim 2, wherein the first retaining features are individually positioned at opposite ends of the sleeve and extend outwardly from the sleeve first wall in a direction substantially perpendicular to the sleeve first wall.

5. The end cap for use in assembling a shelving system of claim 4, wherein the second retaining features are individually positioned at opposite ends of the sleeve and extend outwardly from the sleeve third wall in an opposite direction from the first retaining features, and substantially perpendicular to the sleeve third wall.

6. The end cap for use in assembling a shelving system of claim 1, further comprising a plurality of ribs disposed on an inner surface of the retaining features, the ribs integrally formed with the inner surface and configured to facilitate a press fit between the retaining features and the end of the support.

7. The end cap for use in assembling a shelving system of claim 1, wherein the sleeve includes an open end, and a closed end.

8. The end cap for use in assembling a shelving system of claim 1, further including multiple wedges disposed in the cavity of each of the retaining features, each of the wedges integrally formed on the outer surface of the sleeve and extend outwardly therefrom in a substantially perpendicular direction, the wedges cooperating with the inner surface of the retaining features to form a channel for guiding and receiving the support.

9. The end cap for use in assembling a shelving system of claim 1, wherein the sleeve includes first and second sleeves coupled to each other defining a T-shaped end cap, having the slot of each of the first and second sleeves oppositely facing with respect to each other.

10. A shelving system, comprising:
a plurality of shelf members;
a plurality of supports for supporting the shelf members; and
a plurality of end caps, each end cap having a sleeve with an outer surface and an inner surface, and a slot formed in the end cap defined by the inner surface of the sleeve, the slot receiving an end of one of the shelf members, and the end cap further having first and second retaining features, each of the first and the second retaining features having an inner surface defining a cavity receiving an end of one of the plurality of supports;
wherein the first and the second retaining features are individually positioned at opposite ends of the sleeve and extend outwardly from the outer surface of the sleeve, and
wherein the inner surface of the slot has a plurality of elongate protrusions integrally formed thereon to facilitate a press fit between the sleeve and the shelf member, and wherein successive ones of the protrusions are arranged parallel to each other and taper in thickness inwardly from an open end of the sleeve to a closed end of the sleeve, and wherein the thickness at the open end is greater than the thickness at the closed end.

11. The shelving system of claim 10, wherein the sleeve includes first and second sleeves coupled to each other defining a T-shape, having the slot of each of the first and second sleeves oppositely facing with respect to each other.

12. The shelving system of claim 11, wherein the first and the second sleeves are integrally coupled to each other.

13. The shelving system of claim 10, further including multiple wedges disposed in the cavity of each of the retaining features, each of the wedges integrally formed on the outer surface of the sleeve and extend outwardly therefrom in a substantially perpendicular direction.

14. The shelving system of claim 13, wherein the wedges contact an interior surface of the support and cooperate with the inner surface of the retaining features to form a channel for guiding and receiving the support.

15. A shelving system kit, comprising:
a plurality of shelf members;
a plurality of supports; and
a plurality of end caps, each of the end caps having a sleeve with an outer surface and an inner surface, and a slot formed therein defined by the inner surface of the sleeve, the slot configured for receiving an end of one of the shelf members, and the end cap further having first and second retaining features integrally formed with and extending outwardly from an outer surface of the sleeve at opposite ends of the sleeve, each of the first and the second retaining features having an inner surface defining a cavity configured for receiving an end of one of the supports, and
wherein the inner surface of the slot has a plurality of elongate protrusions integrally formed thereon to facilitate a press fit between the sleeve and the shelf member, and wherein successive ones of the protrusions are arranged parallel to each other and taper in thickness inwardly from an open end of the sleeve to a closed end of the sleeve, and wherein the thickness at the open end is greater than the thickness at the closed end.

16. The shelving system kit of claim 15, wherein the sleeve includes first and second sleeves coupled to each other defining a T-shape, having the slot of each of the first and second sleeves oppositely facing with respect to each other, the first and the second sleeves positionable to join first and second columns of the shelf members.

17. The shelving system kit of claim 15, wherein the supports are rectangular shaped and the cavity is rectangular shaped.

18. The shelving system kit of claim 15, wherein a shape of the supports matches a shape of the cavity.

* * * * *